Sept. 16, 1952 H. ENDERLE ET AL 2,610,884
MEANS FOR REMOVING OLIVES AND THE LIKE FROM CONTAINERS
Filed Sept. 20, 1949
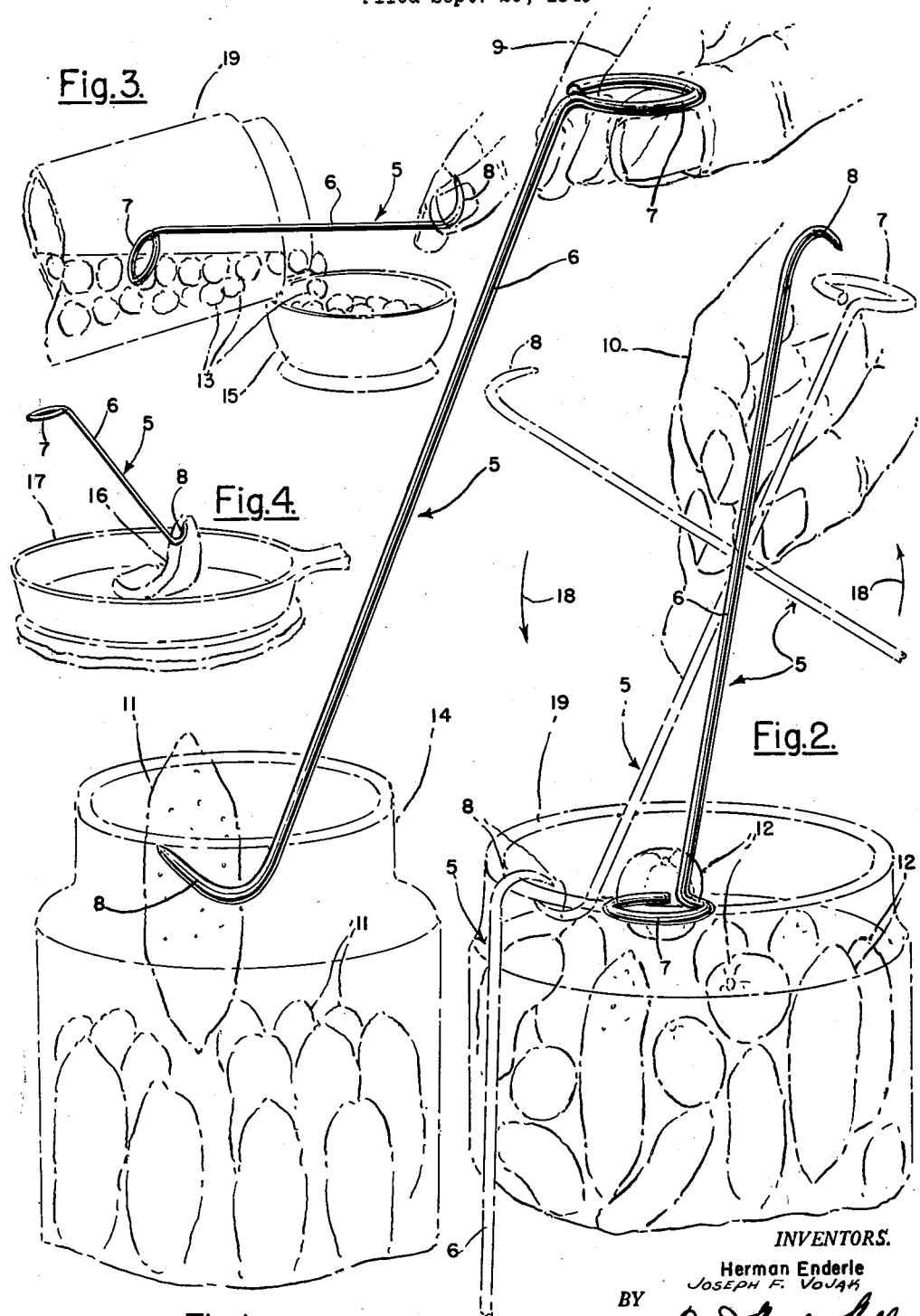
INVENTORS.
Herman Enderle
Joseph F. Vojak
BY
Attorney Patented Sept. 16, 1952

2,610,884

UNITED STATES PATENT OFFICE 2,610,884

MEANS FOR REMOVING OLIVES AND THE LIKE FROM CONTAINERS

Herman Enderle and Joseph F. Vojak, Chicago, Ill.

Application September 20, 1949, Serial No. 116,726

2 Claims. (Cl. 294—15)

Our invention relates to means for removing olives and the like from containers.

A prime object of our invention is to provide a household device having a hook portion at one end and ring portion at the other, for facilitating the removal of olives, pickles, fruit, meat and the like from containers, particularly from containers having small openings in which the fruit, pickles or olives are tightly packed.

A further important object of our invention is the provision of hook means and complementary ring means used respectively for lancing non-floating objects tightly packed in a jar having a restricted opening and for lancing and/or lifting floatable objects by alternately bringing into play either the said hook portion or the said ring portion by simply rotating the body of the device comprising our invention within an ambit of substantially 180° in order to afford uninterrupted removal operation.

A further object of our invention is to provide a kitchen utensil of the above described character, either end of which may serve as a handle while manipulating pickles, olives, fruit and the like with the other end, or the utensil may be grasped midway by the fingers and quickly reversed from time to time while moving such edibles as mixed pickles wherein the hook and the ring would alternately be brought into use.

A still further object of our invention provides a means for removing olives and the like from containers, the ring end of which would serve as a strainer for removing small fruits or olives from the liquid of a container into a dish.

A further object of our invention is to provide means for removing olives and the like from containers that is of extremely simple design and which may be economically produced in quantity.

Other objects and advantages embraced in our invention will be disclosed in the following description and the accompanying illustrations, wherein like parts are designated by like numerals and in which:

Fig. 1 is a perspective view of our invention wherein the fingers of a hand are shown grasping the ring portion and manipulating a pickle from a small mouthed jar with the hook end portion.

Fig. 2 is a perspective view of our invention shown being grasped by the fingers midway between hook and ring and susceptible of being reversed as shown by dotted lines to bring both hook and ring into use alternately.

Fig. 3 is a perspective view of our invention wherein the ring end thereof is shown being used as a strainer to remove small fruits or olives from a container into a dish.

Fig. 4 is a perspective view of our invention with the hook end thereof being used to manipulate meat in a frying pan.

Referring to the illustrations, our invention is generally designated 5 and consists of a straight wire body portion 6 approximately six inches in length and preferably made of stainless steel.

One end of body 6 is formed into a ring portion 7, the plane of which is in approximately a 75° angular relationship with the straight body portion 6.

The said ring portion 7 would be of a diameter large enough to enable a finger to be inserted therein or to hold an olive or small fruit frictionally.

Fig. 1 illustrates one of the main uses of our invention which is being grasped by finger 9 through ring 7, while the hook end 8 is used to manipulate a pickle 11 from a small mouthed jar 14.

Fig. 2 illustrates still another use for our invention, wherein the body portion 6 thereof is shown being grasped by the fingers 10 and alternately removing small round pickles and olives 12 with the ring portion 7 and pickles 11 with the hook portion 8 by quickly reversing the utensil 5 as shown by arrows 18 and the reversing operation being shown in dotted lines. Thus, it is possible to remove a variety of sizes and shapes of edibles from containers 19 with the same utensil, by alternately using both ends thereof. Fig. 2 also shows the utensil 5 hanging from the mouth of the container 19 when not in use.

Fig. 3 illustrates still a further use for our invention, wherein the ring portion 7 is being used as a strainer to quickly remove a number of small fruits or olives 13 from a container 14 into a dish 15, when it is desirable to remove the said olives or fruit without the liquid.

Fig. 4 illustrates a further use for our invention, wherein the hook end 8 thereof is shown manipulating a portion of meat 16 in a frying pan 17.

A principal advantage of our invention resides in its versatility of uses, wherein the ring and hook portions may be brought into use quickly in the same operation to remove various sizes and shapes of edibles from containers merely by twirling or reversing the utensil when grasped by the fingers upon its body portion.

Furthermore, both ends of our invention serve simultaneously as both hook and handle.

Considering the illustration designated Fig. 2 a jar shows olives and pickles tightly packed. As indicated on the said figure, after some of the pickles had been removed by the hook portion 8 of the instrument 5 shown in lancing position in phantom lines, any olives released to float upon the surface of the brine solution must necessarily be lifted by the ring portion 17, the same being readily accomplished by rotating the instrument 5 from the phantom line position to the full line position approximately an angle of 180°. It should also be noted that the hook and ring portions of the instrument are in transverse relationship to the body 6 and also diagonally opposed to afford the greatest efficiency for the purposes for which the instrument 5 is purportedly to be used.

Although our invention has been described, the terms used are to be deemed terms of description rather than terms of limitation, our intention being to retain the right to all mechanical equivalents of the structural elements depicted, provided they fall within the purview of the appended claims.

Having thus disclosed and revealed our invention, what we claim as new and desire to secure by Letters Patent is:

1. Means for removing floatable elements and non-floating elements and the like from containers in which both the said floatable elements and the said non-floating elements are compactly packed and confined in a solution affording buoyancy to the said floatable elements when released from their compact assemblage, comprising a body portion, a hook portion at one terminus of the said body portion, and a ring portion at the other terminus of the said body portion, the said hook portion and the said ring portion being utilized alternately but continuously as conditions require for lancing and removal of the said non-floating elements and for first loosening with the said hook portion preparatory to removal with the said ring portion the said floatable elements which when released from compact assemblage have become floating elements and for removal of the said floating elements from the said container.

2. Means for removing floatable elements and non-floating elements and the like from containers in which both the said floatable elements and the said non-floating elements are compactly packed and confined in a solution affording buoyancy to the said floatable elements when released from their compact assemblage, comprising a body portion, a pointed hook portion at one terminus of the said body portion, and a ring portion at the other terminus of the said body portion, the said pointed hook portion and the said ring portion being utilized alternately but continuously as conditions require for lancing and removal of the said non-floating elements and for first loosening with the said pointed hook portion preparatory to removal with the said ring portion the said floatable elements which when released from compact assemblage have become floating elements and for removal of the said floating elements from the said container.

HERMAN ENDERLE.
JOSEPH F. VOJAK.

REFERENCES CITED

The following references are of record in the file of this patent:

UNITED STATES PATENTS

| Number | Name | Date |
| --- | --- | --- |
| 27,802 | Hills | Apr. 10, 1860 |
| 130,767 | Taber | Aug. 20, 1872 |
| 1,674,294 | O'Rourke | June 19, 1928 |
| 2,184,216 | Gross | Dec. 19, 1939 |

FOREIGN PATENTS

| Number | Country | Date |
| --- | --- | --- |
| 44,537 | Sweden | Sept. 18, 1918 |
| 145,931 | Switzerland | June 1, 1931 |